United States Patent
Guo et al.

(10) Patent No.: US 10,657,973 B2
(45) Date of Patent: May 19, 2020

(54) METHOD, APPARATUS AND SYSTEM (71) Applicant: SONY CORPORATION, Tokyo (JP)

(72) Inventors: Xin Guo, Stuttgart (DE); Stefan Uhlich, Stuttgart (DE); Yuhki Mitsufuji, Stuttgart (DE)

(73) Assignee: SONY CORPORATION, Tokyo (JP)

(*) Notice: Subject to any disclaimer, the term of this patent is extended or adjusted under 35 U.S.C. 154(b) by 90 days.

(21) Appl. No.: 15/516,368

(22) PCT Filed: Sep. 29, 2015

(86) PCT No.: PCT/EP2015/072451
§ 371 (c)(1),
(2) Date: Mar. 31, 2017

(87) PCT Pub. No.: WO2016/050780
PCT Pub. Date: Apr. 7, 2016

(65) Prior Publication Data
US 2017/0301354 A1    Oct. 19, 2017

(30) Foreign Application Priority Data
Oct. 2, 2014 (EP) .................................. 14187412

(51) Int. Cl.
*G10L 19/008* (2013.01)
*G10L 21/0272* (2013.01)
(Continued)

(52) U.S. Cl.
CPC .......... *G10L 19/008* (2013.01); *G06K 9/6245* (2013.01); *G10L 21/0272* (2013.01); *G10H 2210/041* (2013.01); *G10H 2210/056* (2013.01); *G10H 2250/235* (2013.01); *G10L 21/0308* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,104,996 A | * | 8/2000 | Yin | G10L 19/06 704/219 |
| 6,253,182 B1 | * | 6/2001 | Acero | G10L 13/10 704/258 |

(Continued)

FOREIGN PATENT DOCUMENTS

WO    2014-147442 A1    9/2014

OTHER PUBLICATIONS

Martin Z.Spiertz, et al, "Source-Filter based Clustering for Monaural Blind Source Separation", Proc. of the 12th Int Conference on Digital AUdio Effects (DAFx-09) (Year: 2009).*

(Continued)

*Primary Examiner* — Jamal Javaid
*Assistant Examiner* — Thad N Defauw
(74) *Attorney, Agent, or Firm* — Xsensus LLP (57) ABSTRACT

A method including decomposing a magnitude part of a signal spectrum of a mixture signal into spectral components, each spectral component including a frequency part and a time activation part; and clustering the spectral components to obtain one or more clusters of spectral components, wherein the clustering of the spectral components is computed in the time domain.

22 Claims, 6 Drawing Sheets (51) Int. Cl.
 G06K 9/62 (2006.01)
 G10L 21/0308 (2013.01)

(56) References Cited

U.S. PATENT DOCUMENTS

| | | | |
|---|---|---|---|
| 6,452,681 B1* | 9/2002 | Carver | G01J 3/1895 |
| | | | 356/450 |
| 7,415,392 B2 | 8/2008 | Smaragdis | |
| 8,563,842 B2 | 10/2013 | Kim et al. | |
| 9,438,992 B2* | 9/2016 | Every | G10L 21/0208 |
| 2003/0046064 A1* | 3/2003 | Moriya | H03M 7/30 |
| | | | 704/201 |
| 2006/0064299 A1* | 3/2006 | Uhle | G06K 9/6242 |
| | | | 704/212 |
| 2010/0138010 A1 | 6/2010 | Aziz Sbai et al. | |
| 2010/0185695 A1* | 7/2010 | Bekkerman | G06F 16/2465 |
| | | | 707/803 |
| 2013/0010968 A1 | 1/2013 | Yagi et al. | |
| 2016/0126915 A1* | 5/2016 | Fukue | G06F 17/14 |
| | | | 381/101 |

OTHER PUBLICATIONS

R Jaiswal et al, "Non-negative Matrix Factorization based Algorithms to cluster Frequency Basis Functions for Monaural Sound Source Separation" (Year: 2013).*
Martin Spiertz, et al, "Source-Filter based Clustering for Monaural Blind Source Separation", Proc. of the 12th Int Conference on Digital AUdio Effects (DAFx-09) (Year: 2009).*
Eamonn Keough et al, "Towards Parameter-Free Data Mining", University of California (Year: 2004).*
T. Virtanen, "Monaural sound source separation by nonnegative matrix factorization with temporal Continuity and sparseness criteria" *IEEE Transactions on Audio, Speech and Language Processing*, vol. 15, pp. 1066-1074, 2007.
M. Spiertz, et al., "Source-filter based clustering for monaural blind source separation," *Proc. Int. Conference on Digital Audio Effects*, 2009.
R. Jaiswal, et al., "Clustering NMF basis functions using shifted NMF for monaural sound source separation," *Proc. IEEE Conference on Acoustics, Speech, and Signal Processing (ICASSP)*, pp. 245-248, 2011.
D. Lee, et al., "Algorithms for non-negative matrix factorization," *Advances in neural information processing systems*, pp. 556-562, 2000.
B. Yang, "A study of inverse short-time Fourier transform," *Proc. IEEE Conference on Acoustics, Speech, and Signal Processing (ICASSP)*, pp. 3541-3544, 2008.
S. Haykin, "*Adaptive Filter Theory*", Prentice-Hall, 4th edition, 2002.
S. M. Kay, "*Fundamentals of Statistical Signal Processing", vol. 1: Estimation Theory*, Prentice-Hall, 1993.
S. Theodoridis, et al., "*Pattern Recognition*", Academic Press, 2006.
E. M. Grais, et al., "Single channel speech music separation using nonnegative matrix factorization and spectral mask," *Digital Signal Processing (DSP), 2011 17th International Conference on IEEE*, pp. 1-6, 2011.

J. Fritsch, et al., "Score informed audio source separation using constrained nonnegative matrix factorization and score synthesis," *Proc. IEEE Conference on Acoustics, Speech, and Signal Processing (ICASSP)*, pp. 888-891, 2013.
J. Fritsch, "High quality musical audio source separation," *Master's Thesis, UPMC/ IRCAM / Telecom ParisTech*, 2012.
Z. Duan, et al., "Soundprism: An online system for score-informed source separation of music audio," *IEEE Journal of Selected Topics in Signal Processing*, vol. 5, No. 6, pp. 1205-1215, 2011.
J. Fritsch, et al., "A comparison of two different methods for score-informed source separation," *5th International Workshop on Machine Learning and Music*, 2012.
E. Vincent, et al., "Performance measurement in blind audio source separation," *IEEE Transactions on Audio, Speech and Language Processing*, vol. 14, No. 4, pp. 1462-1469, 2006.
P. Brady, "Matlab Mel filter implementation," http://www.mathworks.com/matlabcentral/ fileexchange/23179-melfilter, 2014, [Online].
F. Zheng, et al., "Comparison of different implementations of MFCC," *Journal of Computer Science and Technology*, vol. 16, No. 6, pp. 582-589, 2001.
B. W. Bader, et al., "MATLAB tensor toolbox version 2.5," http://www.sandia.gov/-tgkolda/TensorToolbox/, 4 Pages, 2012, [Online].
B. W. Bader, et al., "Algorithm 862: MATLAB tensor classes for fast algorithm prototyping," *ACM Transactions on Mathematical Software*, vol. 32, No. 4, pp. 635-653, 2006.
D. FitzGerald, "Harmonic/percussive separation using Median filtering," *Proc. of the 13$^{th}$, International Conference on Digital Audio Effects*, [DAFx10], Total 7 Pages, 2010.
Tuomas Virtanen, "Sound Source Separation in Monaural Music Signals" Tempere University of Technology, Total 134 Pages, 2006.
B. Wang, et al, "Musical Audio Stream Separation by Non-Negative Matrix Factorization", In Proc. Digital Music Res. Netw. Summer Conf. (DMRN), Gasgow, U.K., Total 5 Pages, 2005.
R. Jaiswal et al., "Non-negative Matrix Factorization based Algorithms to cluster Frequency Basis Functions for Monaural Sound Source Separation", Total 211 Pages, 2013.
Martin Spiertz, et al, "Source-Filter based Clustering for Monaural Blind Source Separation", Proc. of the 12$^{th}$ Int. Conference on Digital Audio Effects (DAFx-09), Total 7 Pages, Sep. 1-4, 2009.
Eamonn Keough et al, "Towards Parameter-Free Data Mining", University of California, Total 12 Pages, Jan. 1, 2004, XP055050555.
Sang Ha Park, et al, "Clustering Algorithm for Unsupervised Monaural Musical Sound Separation based on Non-negative Matrix Factorization", IEICE Transactions on Fundamentals of Electronics, Communications and Computer Sciences, Engineering Sciences Society, vol. E95A, No. 4, pp. 818-823, Apr. 1, 2012.
Beiming Wang, et al, "Investigating Single-Channel Audio Source Separation Methods based on Non-Negative Matricx Factorization", Total 4 Pages, Jan. 1, 2006, XP055235415.
Tuomas Virtanen, "Monaural Sound Source Separation by Nonnegative Matrix Factorization with Temporal Continuity and Sparseness Criteria", IEEE Transactions on Audio, Speech and Language Processing, IEEE Service Center, vol. 15, No. 3, pp. 1066-1074, Mar. 1, 2007, XP011165565.
International Search Report and Written Opinion dated Jan. 5, 2016 in PCT/EP2015/072451 Filed Sep. 29, 2015.

* cited by examiner

| Recording | Instrument | Oracle clustering | | | Proposed method | | | MFCC kmeans [7] | | | Mel NMF [7] | | | Shifted-NMF [9] | | |
|---|---|---|---|---|---|---|---|---|---|---|---|---|---|---|---|---|
| | | SDR | SIR | SAR | SDR | SIR | SAR | SDR | SIR | SAR | SDR | SIR | SAR | SDR | SIR | SAR |
| Brahms | Horn | 7.20 | 9.94 | 10.91 | 7.07 | 13.86 | 8.27 | 3.87 | 5.76 | 9.41 | 4.17 | 5.83 | 10.17 | 2.95 | 3.34 | 15.20 |
| | Piano | 5.73 | 8.48 | 9.59 | 0.64 | 1.04 | 13.63 | 3.30 | 4.42 | 10.76 | −0.10 | 0.21 | 14.39 | 3.78 | 5.59 | 9.50 |
| | Violin | 10.14 | 19.24 | 10.76 | 10.14 | 19.24 | 10.76 | −8.35 | −7.89 | 10.21 | 9.69 | 19.79 | 10.19 | 7.66 | 10.96 | 10.74 |
| Lussier | Bassoon | 8.08 | 11.76 | 10.79 | 8.08 | 11.76 | 10.79 | 1.85 | 11.67 | 2.61 | 0.15 | 0.75 | 11.72 | −0.83 | −0.60 | 15.43 |
| | Piano | 7.15 | 10.93 | 9.83 | 7.15 | 10.93 | 9.83 | 4.66 | 6.28 | 10.64 | 4.56 | 8.00 | 7.83 | 2.54 | 5.14 | 7.16 |
| | Trumpet | 10.10 | 16.87 | 11.22 | 10.10 | 16.87 | 11.22 | −1.73 | −1.29 | 12.18 | 8.46 | 18.12 | 9.05 | 6.57 | 7.39 | 14.95 |
| Mozart | Clarinet | 14.44 | 22.99 | 15.91 | 14.44 | 22.99 | 15.91 | 13.82 | 23.37 | 14.35 | 13.82 | 23.37 | 14.35 | 10.62 | 11.78 | 17.18 |
| | Piano | 9.02 | 5.85 | 11.37 | 9.02 | 5.85 | 11.37 | −3.80 | −3.51 | 13.21 | 5.12 | 6.58 | 11.43 | 4.40 | 5.25 | 13.03 |
| | Viola | 2.62 | 14.44 | 5.31 | 2.62 | 14.44 | 5.31 | −4.83 | −3.80 | 7.28 | −8.25 | −7.92 | 11.66 | 2.41 | 6.55 | 5.39 |
| Schubert | Cello | 7.01 | 16.26 | 7.66 | 7.01 | 16.26 | 7.66 | −6.48 | −6.04 | 10.70 | −7.57 | −7.08 | 9.97 | −0.09 | 0.41 | 12.34 |
| | Piano | 10.64 | 14.67 | 12.98 | 10.64 | 14.67 | 12.98 | 8.85 | 17.92 | 9.49 | 4.05 | 5.84 | 9.77 | 4.44 | 5.06 | 14.35 |
| | Violin | 6.38 | 10.27 | 9.05 | 6.38 | 10.27 | 9.05 | −2.34 | −1.61 | 9.60 | 0.33 | 1.64 | 8.42 | −1.39 | −0.46 | 9.02 |
| Bach | Bassoon | 5.15 | 8.31 | 8.62 | −15.95 | −15.09 | 6.73 | 3.72 | 5.96 | 8.64 | 0.63 | 1.64 | 9.73 | −0.44 | 0.35 | 10.15 |
| | Clarinet | 5.29 | 7.84 | 9.47 | −0.69 | 0.01 | 10.57 | 2.70 | 4.11 | 9.72 | 0.25 | 1.87 | 7.49 | 1.10 | 2.02 | 10.42 |
| | Saxophone | 5.81 | 11.26 | 7.58 | 5.81 | 11.26 | 7.58 | −0.55 | 0.49 | 8.93 | −1.25 | −0.48 | 9.95 | 3.16 | 4.52 | 10.17 |
| | Violin | 7.79 | 14.13 | 9.10 | 8.62 | 15.73 | 9.67 | 5.74 | 8.15 | 10.08 | 7.13 | 13.93 | 8.32 | 4.19 | 5.79 | 10.31 |
| Take Five | Kick | 12.38 | 20.91 | 13.08 | −11.53 | −5.19 | −4.04 | 12.38 | 20.91 | 13.08 | 12.38 | 20.91 | 13.08 | 11.14 | 16.14 | 12.89 |
| | Piano | 4.06 | 6.79 | 8.19 | −0.97 | −0.33 | 10.82 | 2.83 | 6.37 | 6.28 | −1.35 | −0.83 | 11.53 | 2.66 | 4.30 | 9.07 |
| | Ride | 5.67 | 12.59 | 6.89 | 5.67 | 12.59 | 6.89 | −32.39 | −30.38 | 2.31 | −0.48 | 12.56 | −0.02 | −2.63 | −1.23 | 6.64 |
| | Saxophone | 9.47 | 17.72 | 10.25 | 7.66 | 16.69 | 8.34 | 6.84 | 18.12 | 7.24 | 5.39 | 19.53 | 5.60 | 8.26 | 10.78 | 12.17 |
| | Snare | −0.08 | 9.11 | 0.98 | 1.41 | 11.82 | 2.10 | 1.82 | 11.96 | 2.54 | −1.56 | 1.70 | 3.47 | −24.21 | −23.20 | 5.89 |
| MIREX | Bassoon | 7.74 | 14.92 | 8.81 | 7.74 | 14.92 | 8.81 | 1.49 | 3.65 | 7.12 | 1.20 | 3.40 | 6.83 | 0.35 | 1.23 | 10.19 |
| | Clarinet | 6.54 | 9.43 | 10.14 | −1.35 | −0.62 | 10.12 | 1.85 | 2.95 | 10.12 | −1.04 | −0.43 | 11.01 | 1.54 | 2.19 | 12.16 |
| | Flute | 9.76 | 16.02 | 11.05 | 10.07 | 18.88 | 10.74 | 4.71 | 5.79 | 12.30 | 7.50 | 10.36 | 11.05 | 6.30 | 6.95 | 15.63 |
| | Horn | 5.61 | 10.18 | 7.87 | 1.93 | 5.50 | 5.52 | −0.79 | 2.00 | 4.58 | −0.69 | 2.15 | 4.57 | 1.68 | 2.64 | 10.61 |
| | Oboe | −6.22 | −4.43 | 4.26 | −12.97 | −12.54 | 10.05 | −8.86 | −8.18 | 8.30 | −10.89 | −10.62 | 12.27 | −9.23 | −8.30 | 6.82 |

METHOD, APPARATUS AND SYSTEM

CROSS-REFERENCE TO RELATED APPLICATIONS

The present application is based on PCT filing PCT/EP2015/072451 filed Sep. 29, 2015, and claims priority to European Patent Application 14187412.3 filed by the European Patent Office on 2 Oct. 2014, the entire contents of each of which being incorporated herein by reference.

TECHNICAL FIELD

The present disclosure generally pertains to methods, apparatus and systems in the field of single-channel blind source separation.

TECHNICAL BACKGROUND

Blind source separation (BSS), also known as blind signal separation, is the separation of a set of source signals from a set of mixed signals.

Instantaneous, single-channel blind source separation (BSS) deals with the problem of obtaining M estimates $\hat{s}_i(n)$, i=1, . . . , M of the M source signals $s_i(n)$ if only a linear mixture $x(n)=\Sigma_{i=1}^{M} s_i(n)$ of them is given.

One application for BSS is the separation of music into the individual instrument tracks such that an upmixing of the original content is possible.

A known approach to Single-channel BSS is Single-channel BSS using non-negative matrix factorization (NMF). Single-channel BSS using non-negative matrix factorization usually consists of transforming the mixture $x(n)$ into the time-frequency domain using a short-time Fourier transform (STFT), applying NMF to its magnitude spectrum in order to obtain frequency basis vectors and corresponding activation vectors which are summarized in a frequency matrix W and an activation matrix H and, finally, using a suitable clustering such that the components are grouped into clusters.

SUMMARY

In view of the above methods, apparatus and systems are disclosed which may be used with benefits in separating a set of source signals from a mixture signal.

According to a first aspect the disclosure provides a method comprising decomposing a magnitude part of a signal spectrum of a mixture signal into spectral components, each spectral component comprising a frequency part and a time activation part; and clustering the spectral components to obtain one or more clusters of spectral components, wherein the clustering of the spectral components is computed in the time domain.

According to a second aspect the disclosure provides a method comprising decomposing a magnitude part of a signal spectrum of a mixture signal into spectral components, each spectral component comprising a frequency part and a time activation part; and clustering the spectral components to obtain one or more clusters of spectral components, wherein the clustering of the spectral components is based on the compressibility of estimated source signals.

Further aspects are set forth in the dependent claims, the following description and the drawings.

BRIEF DESCRIPTION OF THE DRAWINGS

Embodiments are explained by way of example with respect to the accompanying drawings, in which:

FIG. 7 shows a table in which the signal-to-distortion ratio (SDR), signal-to-interference ratio (SIR) and signal-to-artefact ratio (SAR) values for exemplary instruments are given.

DETAILED DESCRIPTION OF EMBODIMENTS

Figure 1:
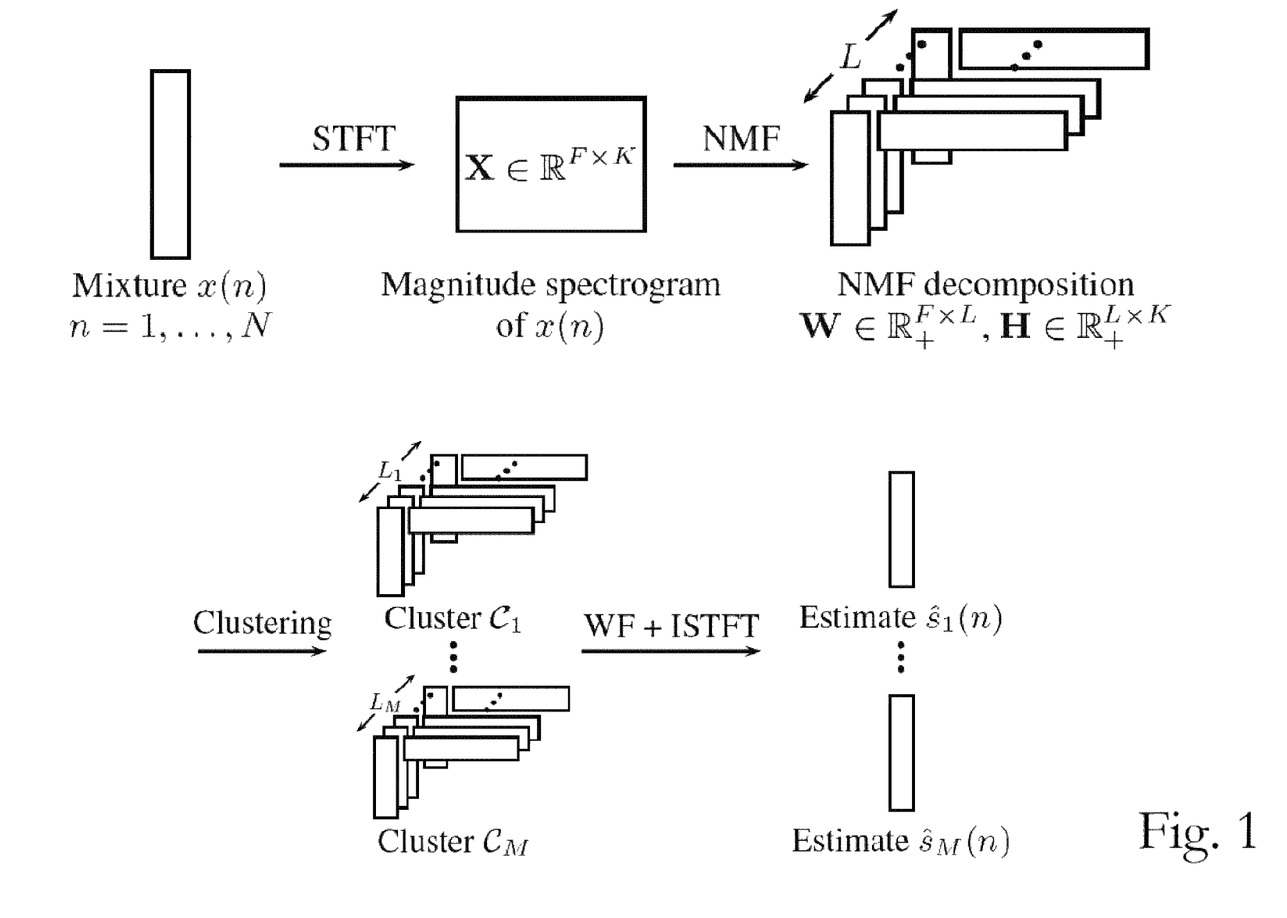
FIG. 1 schematically shows an embodiment of basic steps for a single-channel NMF based source separation.

Before a detailed description of the embodiments under reference of FIG. 1, general explanations are made.

Exemplary methods as described below may comprise decomposing a magnitude part of a signal spectrum of a mixture signal into spectral components, each spectral component comprising a frequency part and a time activation part; and clustering the spectral components to obtain one or more clusters of spectral components.

In some embodiments, the clustering of the spectral components is computed in the time domain.

The methods may be used for blind source separation (BSS) to estimate source signals contained in the mixture signal.

The mixture spectrum typically comprises a predefined number of source signals. A source may for example be a musical instrument such as a violin, a flute, or a drum. The source may as well be any other defined sound source. The embodiments assume that the total number of sources in the mixture is known. In embodiments in which the number of sources in the mixture is not known, the number of sources may be estimated or guessed.

Decomposing the magnitude part of the signal spectrum into spectral components may be based on non-negative matrix factorization (NMF). As NMF is performed, a Kullback-Leibler (KL) divergence may for example be used as cost function to obtain the frequency part and the time activation part. The frequency part and the time activation part may be expressed as two non-negative matrices, a frequency matrix and a time activation matrix.

The spectral components may be expressed as pairs of frequency basis vectors and corresponding activation vectors which are summarized in a frequency matrix and, respectively, a time activation matrix. The total number of spectral components may be predefined. For example, a total number of five to ten spectral components may be assumed for each source in the mixture. If for example a mixture signal is assumed to contain four sources, then a total number of 20 to 40 spectral components may be defined. Alternatively, the total number of components per source may be configured to the specific instruments in the mixture. The number of components for a specific source may for example be configured to comply with the total number of "notes" an instrument plays.

In embodiments in which the clustering of the spectral components is computed in the time domain a new clustering criterion is presented which may have the advantage that it not only takes into account the frequency basis but also the learned time activation patterns by performing the clustering in the time domain.

The clustering may comprise generating time components based on the spectral components. The generating time components may for example comprise calculating an inverse short-time Fourier transform based on the spectral component of the signal spectrum. The time components may be obtained by Wiener filtering the spectral components and applying an inverse short-time Fourier transform (ISTFT).

Clustering of the spectral components may be based on the compressibility of estimated source signals. According to some embodiments, an assumption is made that an estimated source signal can be compress better if it only contains components from one source and, hence, the task is to find the clustering which results in source estimates that can be most compressed. According to some embodiments the linear predictive coding (LPC) compression error of the source estimates is minimized as one can expect that a clustering where each estimate only contains one source can be compressed more than a clustering where estimates contain interference from other sources. Using this new clustering may improve source separation results compared to the current state-of-the-art algorithms aforementioned.

For example, clustering the spectral components may comprise minimizing a compression error of estimated source signals.

The compression error may be determined based on linear predictive coding (LPC).

The compression error may be computed by summing compression errors of estimated source signals.

The compression error for the estimated source signal may be computed based on a causal impulse response of an optimal linear predictive coding filter.

Clustering the spectral components may be based on minimizing the energy of an overall compression error that is calculated based on a matrix which has a Toeplitz structure.

Further, clustering the spectral components may be based on an iterative algorithm which minimizes the energy of a compression error of estimated source signals.

The iterative algorithm may comprise a random generation of the initial clustering.

Each iteration of the iterative algorithm may comprise choosing a predefined number of arbitrary components; computing for all possible assignments of the chosen components to the clusters a compression error, and assigning the chosen components to the clusters such that the compression error is minimized. The predefined number of arbitrary components may be, for example, two, three or any other predefined number.

The method may further comprise restarting the iterative algorithm several times with different initial clustering constellations and merging their results.

Merging the results of the iterative algorithm may comprise computing from the clustering results a similarity matrix. The similarity matrix may comprise elements where the (i,j)th element gives the probability that the ith and jth component are in the same cluster. A clustering algorithm such as kmedoids may be run on the similarity matrix to output a final clustering.

The method may further comprise precomputing products of matrixes and/or vectors which are based on the time components. This may allow an efficient computation of an LPC error.

The method may further comprise estimating a source signal based on the clusters. Estimating a source signal may comprise Wiener filtering to get a source spectrogram estimate and applying an inverse short-time Fourier transform (ISTFT) to the source spectrogram estimate.

A further method may comprise decomposing a magnitude part of a signal spectrum of a mixture signal into spectral components, each spectral component comprising a frequency part and a time activation part; and clustering the spectral components to obtain one or more clusters of spectral components, wherein the clustering of the spectral components is based on the compressibility of estimated source signals.

A further method may comprise encoding a multi-channel audio signal, the coding comprising applying source separation to the multi-channel audio signal. This may allow to separate a (multi-channel) mixture into source estimates which can be transmitted together with the source positions instead of transmitting the multi-channel recording themselves. At a receiver, a spatial rendering technique, e.g., wave field synthesis (WFS) may be used to regenerate the original multi-channel loudspeaker signal. For example, LPC may be used to compress estimated source signals which may reduce the required bit rate as only the LPC coefficients and a residual are transmitted.

An audio codec may be configured to comprise applying source separation to a multi-channel audio signal as described above. For example, an MPEG 3D audio codec might implement source separation as described in the embodiments.

An audio codec may for example be configured to encode a multi-channel audio signal, the encoding comprising: decomposing a magnitude part of a signal spectrum of a mixture signal into spectral components, each spectral component comprising a frequency part and a time activation part; and clustering the spectral components to obtain one or more clusters of spectral components.

An apparatus may comprise a processor which is configured to implement the methods described above. The apparatus may further comprise a memory and/or an I/O section. The apparatus may be a server, a workstation, a desktop PC, a notebook, a smartphone, a wearable device or any other computing device.

An apparatus according to an embodiment may comprise a processor which is configured to decompose a magnitude part of a signal spectrum of a mixture signal into spectral components, each spectral component comprising a frequency part and a time activation part and cluster the spectral components to obtain one or more clusters of spectral components, wherein the clustering of the spectral components is computed in the time domain.

An apparatus according to a further embodiment may comprise a processor which is configured to decompose a magnitude part of a signal spectrum of a mixture signal into spectral components, each spectral component comprising a frequency part and a time activation part; and cluster the spectral components to obtain one or more clusters of spectral components, wherein the clustering of the spectral components is based on the compressibility of estimated source signals.

An apparatus according to a still further embodiment may comprise a processor which is configured to encode a multi-channel audio signal, the encoding comprising:

decomposing a magnitude part of a signal spectrum of a mixture signal into spectral components, each spectral component comprising a frequency part and a time activation part; and clustering the spectral components to obtain one or more clusters of spectral components.

A system may comprise an apparatus with a processor which is configured to implement the methods described above. The system may for example be a cloud server system which offers blind source separation as a cloud service. The system may also comprise one or more servers that offer blind source separation as Software-as-a-Service (SaaS).

Single-Channel NMF Based BSS

Embodiments are now described by reference to the accompanying Figures and by presenting formulas and equations which may be used to implement the disclosed methods.

The remainder of this specification is organized as follows: First, it is described an embodiment of a NMF approach for single-channel BSS. Then an embodiment of a compression error criterion is demonstrated and then it is shown that it can be efficiently computed and used for clustering. Finally, results on the TRIOS dataset are given.

The following notation is used throughout this specification: x denotes a column vector and X a matrix where in particular I is the identity matrix. The trace operator, column stacking operator, determinant, matrix transpose and Euclidean norm are denoted by $tr\{.\}$, $vec\{.\}$, $det\{.\}$, $(.)^T$ and $\|.\|$, respectively. $X.*Y$ denotes the element-wise (Hadamard) product of X with Y and $X^{.^2}$ the element-wise squaring of X.

In the following, it is described, with reference to FIG. 1, embodiments of the basic steps for single-channel NMF based source separation.

Let $x(n) \in \mathbb{R}$ with $n=1, \ldots, N$ denote a mixture signal which is composed of M source signals $s_1(n), \ldots, s_M(n)$, i.e., $$x(n) = \sum_{i=1}^{M} s_i(n). \quad (1)$$

Such signals can be observed in many fields and the task of BSS is to recover estimates $\hat{s}_1(n), \ldots, \hat{s}_M(n)$ of the source signals if only the mixture signal x(n) is available. Details for each step will be given below:

(a) Time-Frequency Representation:

In order to use NMF, it is first computed the STFT of the mixture signal x(n) and the spectrogram $S(f, k)=STFT\{x(n)\}$ is obtained where $f=1, \ldots, F$ denotes the frequency bin index and $k=1, \ldots, K$ the frame index. The STFT of x(n) can conveniently be summarized in matrix notation as $S=X.*P \in \mathbb{C}^{F \times K}$ where $X \in \mathbb{R}_+^{F \times K}$ and $P \in \mathbb{C}^{F \times K}$ denote the magnitude and phase spectrogram, respectively.

(b) Non-Negative Matrix Factorisation:

Assuming that each source has a characteristic frequency spectrum which can be expressed by a small number of frequency basis vectors, NMF can be used to extract them: After the transformation of the mixture x(n) into the time-frequency domain using a short-time Fourier transform (STFT), NMF is applied to its magnitude spectrum X in order to obtain L frequency basis vectors $\{w_1, \ldots, w_L\}$ and L corresponding activation vectors $\{h_1, \ldots, h_L\}$ which can be summarized in the frequency matrix $W \in \mathbb{R}_+^{F \times L}$ and activation matrix $H \in \mathbb{R}_+^{L \times K}$ where F denotes the number of frequency bins and K the number of time frames. It will be referred to the pair $\{w_l, h_l\}$ as lth NMF component.

The total number L of components is a predefined quantity which is chosen according to the types of sources contained in the mixture signal. L may be chosen based on the number of sources in the mixture signal and based on the number of sound variations each source may produce. If for example a mixture is assumed to comprise two sources, each source being capable of producing ten different sounds (e.g. notes with different pitches), than L may be chosen to be $2 \times 10 = 20$.

According to the embodiments, as NMF is applied to the magnitude spectrogram X, the Kullback-Leibler (KL) divergence is used as cost function, see for example [4] to obtain the two non-negative matrices W and H with $X \approx WH$. Additionally, temporal continuity may be enforced as proposed in [1] to obtain a NMF result which may benefit the source separation.

The Kullback-Leibler (KL) divergence is well known to the skilled person, see for example [4]. The basic principles will be briefly sketched here:

A general class of divergences that may be used for NMF is the β-divergence:

$$d_\beta(x \mid y) \stackrel{def}{=} \begin{cases} \frac{1}{\beta(\beta-1)}(x^\beta + (\beta-1)y^\beta - \beta xy^{\beta-1}) & \beta \in \mathbb{R} \setminus \{0, 1\} \\ x \log x/y + (y-x) & \beta = 1 \\ \frac{x}{y} - \log \frac{x}{y} - 1 & \beta = 0 \end{cases}.$$

The KL-divergence used in the embodiments presented here is a special case of β-divergence for $\beta=1$. Alternative embodiments may apply alternative divergences, such as the β-divergence with other values of β.

The embodiments apply a multiplicative update rule which is most often used for NMF, namely:

$$H \leftarrow H \cdot \frac{W^T((WH)^{[\beta-2]} \cdot V)}{W^T(WH)^{[\beta-1]}}$$

$$W \leftarrow W \cdot \frac{((WH)^{[\beta-2]} \cdot V)H^T}{(WH)^{[\beta-1]}H^T}$$

(c) Clustering

Using a suitable clustering method such as described in the embodiments below in more detail M clusters $C_1, \ldots, C_M$ are obtained. That is, using a suitable clustering, the L components are grouped into M clusters such that Wiener filter softmasks can be computed and an inverse STFT can be used to obtain the estimates $\hat{s}_i(n)$, $i=1, \ldots, M$.

(d) Source Reconstruction:

Finally, the source signals are found by using Wiener filtering to get source spectrogram estimates and applying an inverse STFT to them, i.e., it is computed $$\hat{s}_i(n) = ISTFT\left\{\frac{\sum_{l \in C_i}(w_l h_l^T)^{.^2}}{\sum_{l=1}^{L}(w_l h_l^T)^{.^2}} .*S\right\} \quad (2)$$

for all $i=1, \ldots, M$. Due to the Wiener filtering, it is known that $x(n) = \sum_{i=1}^{M} \hat{s}_i(n)$. It is noted that in these embodiments any artifacts are neglected that may be due to the inverse STFT reconstruction of reference [5].

Of these steps, the clustering is the most critical one as good source separation results are only obtained, if a good clustering of the components $\{w_l, h_l\}$ can be found. In the following, a new clustering criterion will be introduced which has the advantage that it improves the source separation results compared to the current state-of-the-art methods.

Figure 2:
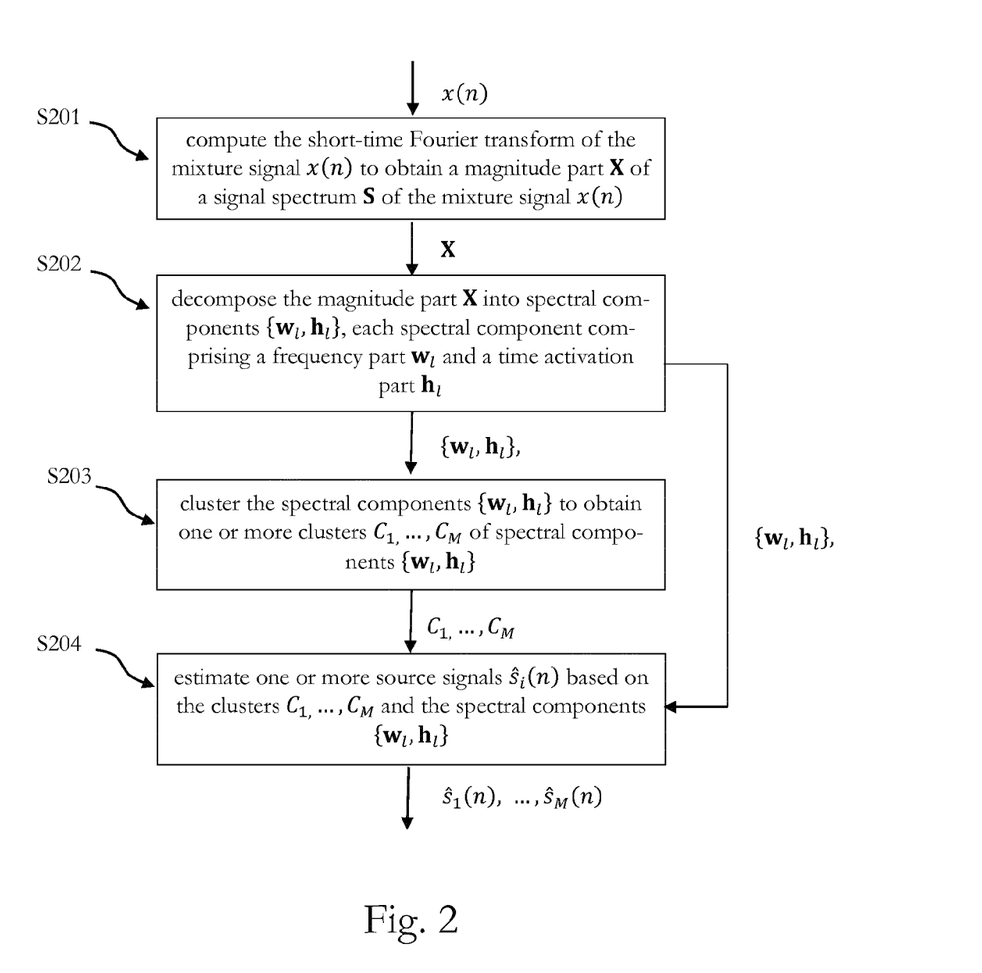
FIG. 2 schematically shows an embodiment of a method for estimating one or more source signals $\hat{s}_i(n)$ in a mixture signal $x(n)$.

FIG. 2 schematically shows a method of estimating one or more source signals $\hat{s}_i(n)$ from a mixture signal $x(n)$. At S201, the short-time Fourier transform of the mixture signal $x(n)$ is computed to obtain a magnitude part X of the signal spectrum S that stems from the mixture signal $x(n)$. At S202, the magnitude part X is decomposed into spectral components $\{w_l, h_l\}$, each spectral component comprising a frequency part $w_l$ and a time activation part $h_l$. At S203, the spectral components $\{w_l, h_l\}$ are clustered to obtain one or more clusters $C_1, \ldots, C_M$ of spectral components $\{w_l, h_l\}$. At S204 one or more source signals $\hat{s}_i(n)$ are estimated based on the clusters $C_1, \ldots, C_M$ and the spectral components $\{w_l, h_l\}$.

LPC Error Clustering Criterion

Definition and Motivation

The clustering criterion according to the embodiments described here is computed in the time domain and therefore, Wiener filtering is first used to obtain L time components $c_1(n), \ldots, c_L(n)$ with $$c_l(n) = ISTFT\left\{\frac{(w_l h_l^T)^{\wedge 2}}{\sum_{l=1}^{L}(w_l h_l^T)^{\wedge 2}} \cdot * S\right\} \quad (3)$$

where $w_l$, $h_l$ are the lth column and row of W and H, respectively.

In order to solve the source separation problem, these L signals are grouped into M clusters $C_1, \ldots, C_M$ such that $\hat{s}_i(n) = \Sigma_{l \in C_i} c_l(n)$ is a good estimate of the ith source signal $s_i(n)$. In these embodiments, the compressibility of the signals $\hat{s}_i(n)$ is used in order to find a good clustering as the assumption is that an estimated source signal $\hat{s}_i(n)$ can be compressed better if it only contains components from one source and, hence, the task is to find the clustering $C_1, \ldots, C_M$ which results in source estimates $\hat{s}_1(n), \ldots, \hat{s}_M(n)$ that can be most compressed. The compression method that is used in these embodiments is linear predictive coding (LPC) which will be outline in the following: In order to see how much an estimated source signal $\hat{s}_i(n)$ can be compressed, the LPC error is computed $$e_i(n) = \hat{s}_i(n) - (h_{\hat{s}_i} * \hat{s}_i)(n), \quad (4)$$

where $h_{\hat{s}_i}(n)$ denotes the causal impulse response of the optimal LPC filter of length P for the signal $\hat{s}_i(n)$ with $h_{\hat{s}_i}(0) = 0$ such that $e_i(n)$ has minimum energy, i.e., at time instance n, $(h_{\hat{s}_i} * \hat{s}_i)(n)$ can be viewed as an optimal estimate of $\hat{s}_i(n)$ given the past samples $\hat{s}_i(n-1), \ldots, \hat{s}_i(n-P)$ and $e_i(n)$ is the difference between the predicted value $(h_{\hat{s}_i} * \hat{s}_i)(n)$ and the true value $\hat{s}_i(n)$. Combining the LPC errors $e_i(n)$ for all sources, the overall error signal $e(n) = \Sigma_{i=1}^{M} e_i(n)$ can be computed and, in order to solve the clustering problem, it is looked for the clustering $C_1, \ldots, C_M$ such that the energy of $e(n)$ is minimized, i.e., it is solved $$\min_{C_1, \ldots, C_M} \sum_{n=1}^{N} e(n)^2 \quad (5)$$

with $$e(n) = \sum_{i=1}^{M} e_i(n) = \sum_{i=1}^{M} \left(\hat{s}_i(n) - (h_{\hat{s}_i} * \hat{s}_i)(n)\right) \quad (6)$$

$$= x(n) - \sum_{i=1}^{M} (h_{\hat{s}_i} * \hat{s}_i)(n).$$

From (6), it can be seen that from the mixture signal $x(n)$ all those parts are subtracted that can be "explained" by LPC and, hence, finding a clustering with minimum energy $\Sigma_{n=1}^{N} e(n)^2$ should result in a good source separation as will be demonstrated in the section titled "RESULTS" below.

Computation of the Optimal LPC Filter

In the following, linear predictive coding will be briefly reviewed. A more detailed discussion can be found in reference [6]. In linear predictive coding, the sample $\hat{s}_i(n)$ is predicted given the last P samples of it, i.e., it is minimized the energy of the residual $e_i(n)$ $$e_i(n) = \hat{s}_i(n) - (h_{\hat{s}_i} * \hat{s}_i)(n), \, n=1, \ldots, N, \quad (7)$$

where $h_{\hat{s}_i}(n) \neq 0$ only for $1 \leq n \leq P$. For convenience, it will be use from now on the following matrix notation: Let $e_i^T = [e(1) \ldots e(N)] \in \mathbb{R}^N$, $\hat{s}_i^T = [\hat{s}_i(1) \ldots \hat{s}_i(N)] \in \mathbb{R}^N$ and $h_{\hat{s}_i}^T = [h_{\hat{s}_i}(1) \ldots h_{\hat{s}_i}(P)] \in \mathbb{R}^P$ denote the error, estimated source signal and LPC impulse response for the ith source, respectively. Then, one can write (7) as $$e_i = \hat{s}_i - \hat{S}_i h_{\hat{s}_i} \quad (8)$$

with $$\hat{S}_i = \begin{bmatrix} 0 & 0 & \ldots & 0 \\ \hat{s}_i(1) & 0 & \ldots & 0 \\ \hat{s}_i(2) & \hat{s}_i(1) & \ldots & 0 \\ \vdots & & \ddots & \\ \hat{s}_i(N-1) & \hat{s}_i(N-2) & \ldots & \hat{s}_i(N-P) \end{bmatrix} \in \mathbb{R}^{N \times P} \quad (9)$$

and it is well known that the optimal prediction filter that minimizes $\|e_i\|^2$ is given by (see [7])

$$h_{\hat{s}_i} = (\hat{S}_i^T \hat{S}_i)^{-1} \hat{S}_i^T \hat{s}_i. \quad (10)$$

Plugging this into (8), one can see that the residual $e_i$ is given by $$e_i = \hat{s}_i - \hat{S}_i (\hat{S}_i^T \hat{S}_i)^{-1} \hat{S}_i^T \hat{s}_i \quad (11)$$

and the overall error is $e = \Sigma_{i=1}^{M} e_i = x - \Sigma_{i=1}^{M} \hat{S}_i (\hat{S}_i^T \hat{S}_i)^{-1} \hat{S}_i^T \hat{s}_i$ which has the energy, i.e., squared $l_2$-norm $$\|e\|^2 = \|x\|^2 - 2\sum_{i=1}^{M} x^T \hat{S}_i (\hat{S}_i^T \hat{S}_i)^{-1} \hat{S}_i^T \hat{s}_i + \quad (12)$$

$$\sum_{i=1}^{M} \sum_{j=1}^{M} \hat{s}_i^T \hat{S}_i (\hat{S}_i^T \hat{S}_i)^{-1} \hat{S}_i^T \hat{S}_j (\hat{S}_j^T \hat{S}_j)^{-1} \hat{S}_j^T \hat{s}_j.$$

In order to find a good source separation result, $c_1(n), \ldots, c_L(n)$ should be clustered such that $\|e\|^2$ is minimized.

Clustering Approach

Outline of the Method

It is now described an iterative algorithm that can be used for minimizing the error energy (12). In each iteration, R components are randomly chosen and they are assigned to the clusters such that the error energy (12) is smallest. Hence, the algorithm consists of the following three steps:
1.) Randomly generate an initial clustering $C_1, \ldots, C_M$.
2.) Choose R (for example R=2) arbitrary components and compute for all $M^R$ possible clustering assignments the compression error. Assign the R components to the clusters such that (12) is minimized.
3.) Repeat Step 2: For each epoch go through all possible subsets of size R until the clustering is stable.

As this iterative approach is only performing a local optimization, i.e., one can not guarantee that it has converged to the clustering with the smallest LPC error, it has been observed that the source separation results can be further improved by restarting the iterative algorithm several times with different initial clustering constellations and merging their results in an additional fourth step:
4.) Repeat Step 1.)-3.) with different initial clusterings. Compute from the clustering results a similarity matrix Q where the (i, j)th element gives the probability that the ith and jth component are in the same cluster and run kmedoids on Q to output a final clustering.

The kmedoids algorithm that is used here is a basic partitioning around medoids (PAM) algorithm, see [8].

The kmedoids algorithm is well-known to the skilled person. An embodiment of the kmedoids algorithm may comprise the following:

At S1, M initial medoids $m_1, \ldots, m_M$ are randomly chosen. Further, at S2, the components are shuffled in a data set. Further, at S3, an update is performed as follows: For each component l which is not a medoid the lth component is swapped with its medoid if the overall similarity S as defined below is increased. Further, S2 and S3 are repeated until $m_1, \ldots, m_M$ do not change anymore.

An overall similarity may be defined as $$S = \sum_{\substack{l=1 \\ l \neq m_i}}^{L} \max_{i=1,\ldots,M} Q_{lm_i}$$

where $Q_{lk}$ denotes the similarity between the lth and kth component of the similarity matrix Q.

Figure 3:
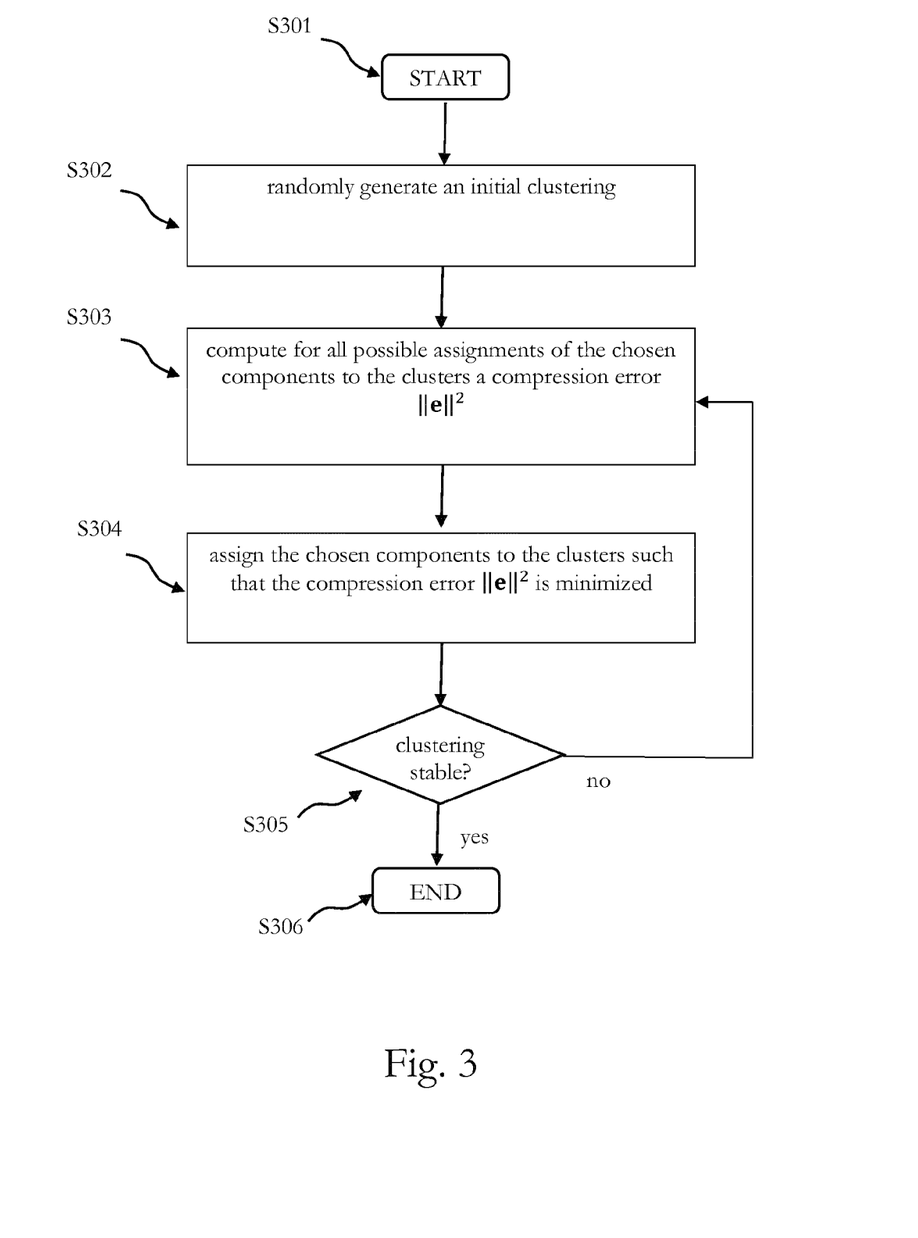
FIG. 3 schematically shows an embodiment of an iterative algorithm for determining a clustering based on a compression error.

FIG. 3 schematically shows an embodiment of an iterative algorithm for determining a clustering based on a compression error. At S301, the algorithm starts. At S302, an initial clustering is randomly generated. At S303, it is computed for all possible assignments of the chosen components to the clusters a compression error $\|e\|^2$. At S304, the chosen components are assigned to the clusters such that the compression error $\|e\|^2$ is minimized. At S305, it is determined if the clustering is stable. If, at S305, it is determined that the clustering is stable, then at S306, the iterative algorithm ends. If, at S305, it is determined that the clustering is not stable, the iterative algorithm returns to S303.

Figure 4:
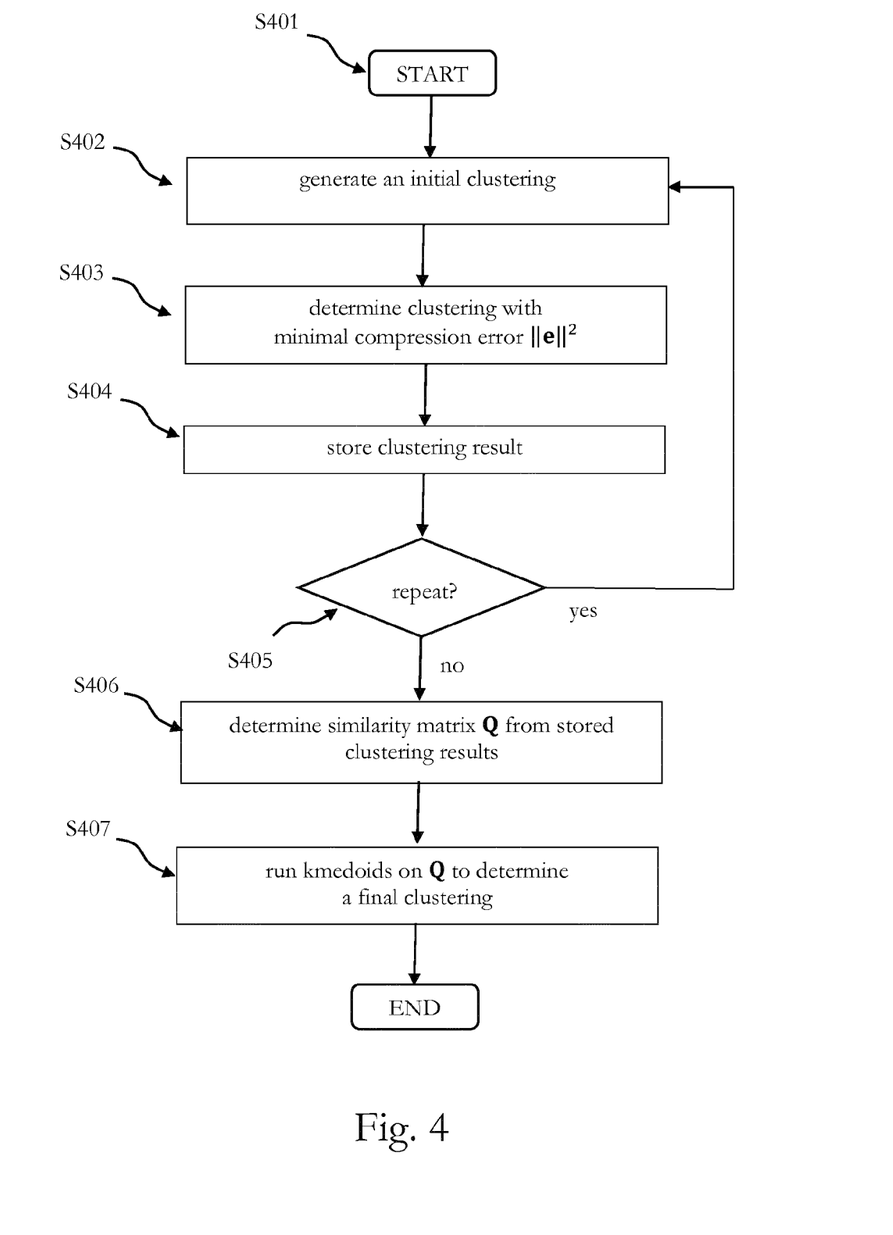
FIG. 4 schematically shows an embodiment of a process for determining a clustering in which the iteration is repeated and the clustering results are merged.

FIG. 4 schematically shows an embodiment of a process for determining a clustering in which the iteration is repeated and the clustering results are merged. At S401, the process starts. At S402, an initial clustering is generated. At S403, it is determined a clustering with minimal compression error $\|e\|^2$ according to the principle described with regard to FIG. 3 (in particular S303, S304 and S305). At S404, the clustering result is stored. At S405, it is determined whether or not the clustering should be repeated. If at S405 it is determined that the clustering should be repeated, the process returns to S402, determining a new initial clustering and repeating step S403. If at S405 it is determined that the clustering should not be repeated, the process proceeds to S406. At S406, it is determined a similarity matrix Q from stored clustering results. At 407, kmedoids is run on Q to determine a final clustering. At S408, the process ends. The process may for example define a predetermined number of times the clustering should be repeated and, at S405, increase a counter as long as the predetermined number has not been reached.

Efficient Computation of the LPC Error

As the LPC error (12) needs to be computed $M^R$ times in each iteration, it is important to be able to efficiently compute it. This is possible as one can exploit the fact that all source estimates $\hat{s}_i(n)$ are computed from the L components $c_i(n)$.

From (11), it can be seen that the (cross-)correlation vector $\hat{S}_i^T \hat{s}_i$ and (auto-)correlation matrix $\hat{S}_i^T \hat{S}_i$ are required in order to compute the error energy $\|e_i\|^2$ which requires either O(N P) operations if it is computed directly or O(N log(N)) operations if computed via the fast Fourier transform (FFT). However, $\hat{S}_i^T \hat{s}_i$ and $\hat{S}_i^T \hat{S}_i$ can be efficiently computed as one knows that $\hat{s}_i(n)$ can be expressed as $\hat{s}_i(n) = \sum_{l \in C_i} c_l(n)$ and, hence, $$\hat{S}_i^T \hat{s}_i = \sum_{l_1 \in C_i} \sum_{l_2 \in C_i} C_{l_1}^T c_{l_2}, \, \hat{S}_i^T \hat{S}_i = \sum_{l_1 \in C_i} \sum_{l_2 \in C_i} C_{l_1}^T C_{l_2}, \quad (13)$$

where $C_l \in \mathbb{R}^{N \times P}$ has the same Toeplitz structure as $\hat{S}_i$ in (9) and is composed of $c_l(n)$ such that $\hat{S}_i = \sum_{l \in C_i} C_l$ and $c_l^T = [c_l(1) \ldots c_l(N)] \in \mathbb{R}^N$ is the vector representation of the lth time component. If the products $C_{l_1}^T c_{l_2}$ and $C_{l_1}^T C_{l_2}$ are precomputed for all $1 \leq l_1, l_2 \leq L$ then one can quickly evaluate (13) at each iteration.

Thus, the computation of $e_i$ in (11) only consists of solving the linear system of equations $\hat{S}_i^T \hat{S}_i h_{\hat{s}_i} = \hat{S}_i^T \hat{s}_i$ which can be done efficiently as P is small, e.g., P=10 in the section titled "RESULTS" below.

Efficient Coding of Multi-Channel Recordings

The disclosed source separation approach can be used for the efficient coding of multi-channel recordings as it allows to separate a (multi-channel) mixture into source estimates which can be transmitted together with information such as source position, time delays, and/or amplitudes instead of transmitting the multi-channel recording themselves. Due to better correlations, data that belongs to a single source can be compressed more efficiently. Encoding separated channels can thus reduce the amount of data, in particular in situations where there are less sources than channels (microphones), but also in situations where there are more sources than channels.

At the receiver, a spatial rendering technique, e.g., wave field synthesis (WFS) can be used to regenerate the original multi-channel loudspeaker signal. Source positions are either estimated from the original multi-channel recording or are assumed to be known from the considered application. As an alternative to using information about the source positions, time delays and/or amplitudes from the microphone recordings might be used which can be transmitted together with the data.

For the efficient transmission of the source estimates, LPC can be used which reduces the required bit rate as only the LPC coefficients and the residual need to be transmitted.

As the NMF components are clustered such that the LPC residual has minimum energy, a good compression of the original recording can be expected.

This technique may for example be used in audio codecs such as the MPEG 3D audio codec.

Apparatus for Implementing the Methods

Figure 5:
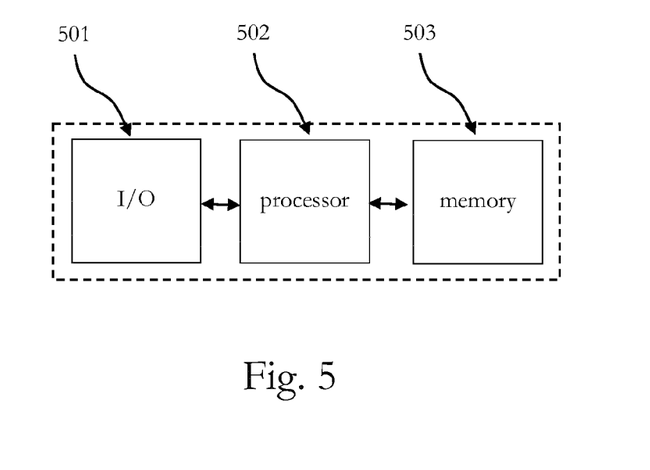
FIG. 5 schematically shows an embodiment of an apparatus which is configured to implement the methods described in this specification.

FIG. 5 schematically shows an embodiment of an apparatus which is configured to implement the methods described above. The apparatus comprises an I/O section 501 which is e.g. configured to receive and send input and output data. For example, I/O section 501 may receive a mixture signal. I/O section 501 is communicatively coupled to a processor 502 which is configured to execute instruction which implement the methods described in this specification. Further, processor 502 is communicatively coupled to a memory 503 which is configured to store computer programs implementing the methods described in this specification, and/or data resulting from and/or during processing of the methods described in this specification.

Figure 6:
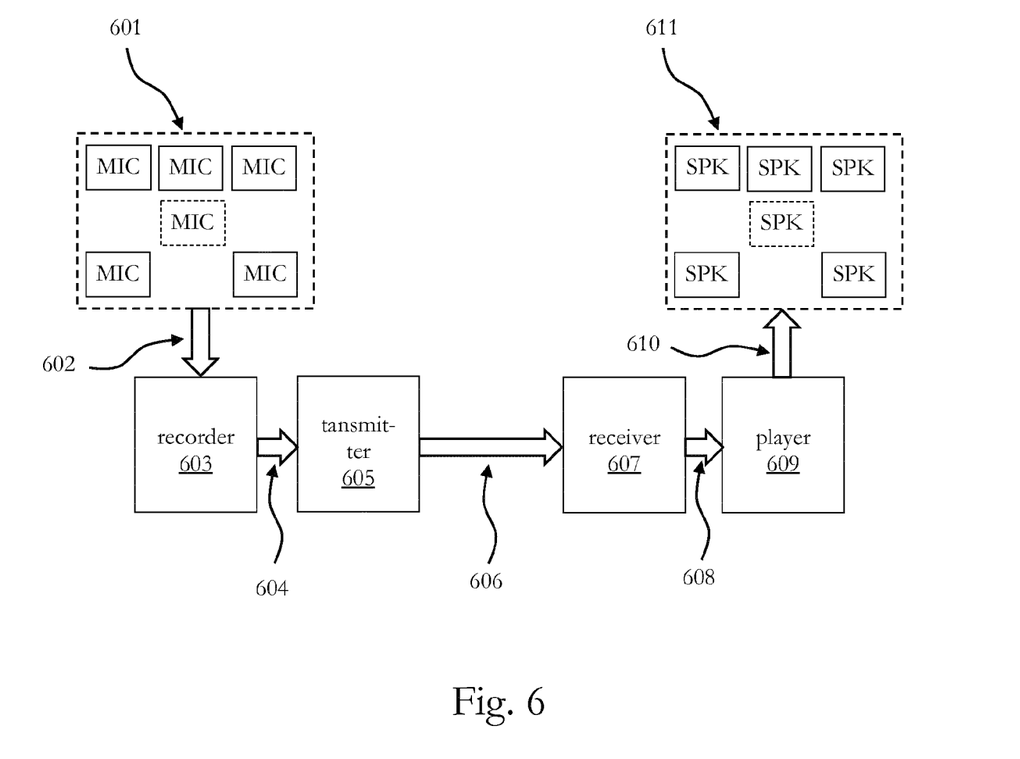
FIG. 6 schematically shows an embodiment of a system which applies source separation for the efficient coding of multi-channel recordings.

FIG. 6 schematically shows an embodiment of a system which applies the disclosed source separation approach for the efficient coding of multi-channel recordings. A six channel (5.1) surround sound multichannel audio system comprises a 5.1 microphone configuration 601 which produces audio signals 602 of six audio channels. A recorder 603 is configured to record the audio signals 602. Recorder 603 is configured to implement a compression algorithm that comprises applying source separation to each of the audio channels to produce a compressed audio signal 604 comprising source estimates. In recorder 603, the source estimates are LPC encoded which reduces the required bit rate as only the LPC coefficients and the residual need to be transmitted. The recorder outputs the compressed audio signal 604 comprising the LPC coded source signals, residuals and source positions to a transmitter 605. Transmitter 605 transmits the compressed audio signal 604 via a communication link 606 to a receiver 607. Receiver 607 passes the received compressed audio signal 608 to a player 609. The player 609 is configured to apply a spatial rendering technique that decompresses the received compressed audio signal 608, and passes the decompressed audio signal 610 to a 5.1 speaker system 611 where the reconstructed audio signals are played back.

Results

In the following, the algorithm of the embodiments is compared with the MFCC-based methods from [2] and shifted-NMF clustering from [3]. The same pre-training procedure is used as mentioned in [9]: For every source $s_i(n)$, the regular KL-NMF algorithm is run separately which yields each time $L_i$ different frequency and activation vectors. Then, the found frequency basis vectors are concatenated for all M sources such that the pre-trained frequency matrix $W \in \mathbb{R}^{F \times L}$ is obtained with $L=L_1+\ldots+L_M$. Finally, KL-NMF is run again on the mixture signal $x(n)$ where W is kept fixed and only update the activation matrix H. This procedure has the advantage that the ground truth of the clustering is known and, hence, one can give also the performance of an oracle system that can conduct a perfect clustering. However, it is important to note that this pre-training step is only done for the sake of having an oracle clustering and the proposed compression error clustering can also be used if the NMF is learned from the mixture only.

The dataset that is used for the experiments is the same as the one that was used in [10]: it includes the whole TRIOS dataset [11] which contains several music mixtures of multiple harmonic instruments, the "Bach" quartet from Bach 10 dataset [12], and the "MIREX" quintet extracted from MIREX 2007 dataset which was also used in [13]. All music files are down-sampled to 16 kHz to speed up the method and the BSS Eval toolbox is utilized to evaluate the obtained source separation results, see [14]. Furthermore, the following experimental settings are used: The magnitude spectrogram of the mixture signal is obtained using a STFT with a 75% overlapping Hamming window and a window length of size 4096. For the pre-training, each source is separated into $L_i=5$ components such that the overall number of components is $L=5M$.

The obtained source separation results are summarized in FIG. 7 where we the following approaches are compared in a table:

"Oracle clustering": The clustering is done according to the ground truth, i.e., $C_i=\{1+5(i-1), \ldots, 5i\}$ as $L_i=5$ is used.

"Proposed method": As introduced in the embodiments described above, the LPC error criterion is used for the clustering with an LPC filter length P=10 and in each iteration, R=2 components are updated. Overall, the algorithm is restarted 50 times in order to calculate the similarity matrix Q and run kmedoids on it to obtain the final clustering.

"MFCC k means [2]": This approach uses a Mel filter bank of size 30 which is applied to the frequency basis vectors in W in order to compute MFCCs. These are then clustered via k means. For the Mel filter bank, the implementation [15] of [16] is used.

"Mel NMF [2]": This approach also applies a Mel filter bank of size 30 to the original frequency basis vectors and uses a second NMF to perform the clustering.

"Shifted-NMF [3]": For this approach, a constant Q transform matrix with minimal frequency 55 Hz and 24 frequency bins per octave is used. The shifted-NMF decomposition is allowed to use a maximum of 24 shifts. The constant Q transform source code was kindly provided by D. FitzGerald and the Tensor toolbox [17,18] is used for the shifted-NMF implementation.

In FIG. 7 it is shown a table in which signal-to-distortion ratio (SDR), signal-to-interference ratio (SIR) and signal-to-artefact ratio (SAR) values for all instruments [14] are given. For each instrument, the separation giving highest SDR is emphasized in bold-face. From the results, it can be seen that the algorithm of the embodiments outputs the source separation with the best average SDR result on all three-source music files ("Brahms", "Lussier", "Mozart" and "Schubert") and "MIREX". For "Bach", although the method of the embodiments is slightly worse than others, it separates the best saxophone and violin part from the mixture and for "Take Five" proposed algorithm is only worse than the Mel NMF method.

The advantage of the clustering method of the embodiments lies in the combination of frequency and time information. A good example of this advantage can be seen for "Schubert": It consists of three sources (cello, piano and violin) where the cello and the violin have similar frequency basis vectors and, hence, the other three algorithms fail to separate these two sources. However, the time activation of these two instruments is disjoint and the method of the embodiments can take advantage of this information.

Finally, it is interesting to note that in some situation, the SDR of the estimated source is even better than for the "oracle" clustering, e.g., for the snare of "Take Five", MFCC k means produces better result than oracle clustering). The reason is that during the procedure of generating separated components, time activation matrix is updated while fixing frequency basis matrix. If two sources have similar frequency basis, it would easily introduce interference to each other through time activation matrix. The quality of source with relatively small amplitude will be damaged. This phenomenon could be seen in Oboe of "MIREX" and Snare of "Take Five". Thus the local optimal of each instrument might not be the Oracle clustering. However, Oracle clustering provides the best clustering in general.

The methods as described herein may be implemented in as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

It should be recognized that the embodiments describe methods with an exemplary ordering of method steps. The specific ordering of method steps is however given for illustrative purposes only and should not be construed as binding.

It should be further recognized that the division of the disclosed apparatus into units is only made for illustration purposes and that the present disclosure is not limited to any specific division of functions in specific units. For instance, the memory 503 could be implemented by a processor which comprises a cache for storing data.

All units and entities described in this specification and claimed in the appended claims can, if not stated otherwise, be implemented as integrated circuit logic, for example on a chip, and functionality provided by such units and entities can, if not stated otherwise, be implemented by software.

Note that the present technology can also be configured as described below.

(1) A method, comprising
decomposing a magnitude part of a signal spectrum of a mixture signal into spectral components, each spectral component comprising a frequency part and a time activation part and
clustering the spectral components to obtain one or more clusters of spectral components, wherein the clustering of the spectral components is computed in the time domain.

(2) A method, comprising
decomposing a magnitude part of a signal spectrum of a mixture signal into spectral components, each spectral component comprising a frequency part and a time activation part; and
clustering the spectral components to obtain one or more clusters of spectral components, wherein the clustering of the spectral components is based on the compressibility of estimated source signals.

(3) A method comprising encoding a multi-channel audio signal, the coding comprising applying source separation as defined in (1) or (2) to the multi-channel audio signal.

(4) The method of (1), (2) or (3), wherein the clustering comprises generating time components based on the spectral components.

(5) The method of anyone of (1) to (4), wherein the generating time components is performed according to $$c_l(n) = ISTFT\left\{\frac{(w_l h_l^T)^{\wedge 2}}{\sum_{l=1}^{L}(w_l h_l^T)^{\wedge 2}} \cdot * S\right\}$$

where $\{w_l, h_l\}$ denotes the lth spectral component of the signal spectrum, $c_l(n)$ denotes the time component which corresponds to the lth spectral component, where S denotes the signal spectrum, and where ISTFT denotes the inverse short-time Fourier transform.

(6) The method of anyone of (1) to (5), wherein the clustering of the spectral components is based on the compressibility of estimated source signals.

(7) The method of anyone of (1) to (6), wherein clustering the spectral components comprises minimizing a compression error of estimated source signals.

(8). The method of (7), wherein the compression error is determined based on linear predictive coding (LPC).

(9) The method of anyone of (7) or (8), wherein the compression error is computed according to $$e(n) = \Sigma_{i=1}^M e_i(n),$$

where $e_i(n)$ denotes the compression error for the ith estimated source signal $\hat{s}_i(n)$ and M denotes the total number of clusters.

(10) The method of anyone of (7) to (9), wherein the compression error for the estimated source signal is computed according to $$e_i(n) = \hat{s}_i(n) - (h_{\hat{s}_i} * \hat{s}_i)(n),$$

where, $e_i(n)$ denotes the compression error for the ith estimated source signal, $\hat{s}_i(n)$ denotes the ith estimated source signal, $h_{\hat{s}_i}(n)$ denotes the causal impulse response of an optimal linear predictive coding filter for the ith estimated source signal.

(11) The method of anyone of (1) to (10), wherein clustering the spectral components is based on minimizing the energy of an overall compression error according to $$\|e\|^2 = \|x\|^2 - 2\sum_{i=1}^M x^T \hat{S}_i (\hat{S}_i^T \hat{S}_i)^{-1} \hat{S}_i^T \hat{s}_i + \sum_{i=1}^M \sum_{j=1}^M \hat{s}_i^T \hat{S}_i (\hat{S}_i^T \hat{S}_i)^{-1} \hat{S}_i^T \hat{S}_j (\hat{S}_j^T \hat{S}_j)^{-1} \hat{S}_j^T \hat{s}_j.$$

with $$\hat{S}_i = \begin{bmatrix} 0 & 0 & \ldots & 0 \\ \hat{s}_i(1) & 0 & \ldots & 0 \\ \hat{s}_i(2) & \hat{s}_i(1) & \ldots & 0 \\ \vdots & & \ddots & \\ \hat{s}_i(N-1) & \hat{s}_i(N-2) & \ldots & \hat{s}_i(N-P) \end{bmatrix} \in \mathbb{R}^{N \times P}$$

where $\|e\|^2$ denotes the energy of the overall compression error, x denotes the mixture signal, $\hat{s}_i$ denotes the estimated source signal, M denotes the total number of clusters, N gives the length of the time domain signal, and P gives the length of the LPC filter.

(12) The method of anyone of (1) to (11), wherein clustering the spectral components is based on an iterative algorithm which minimizes the energy of an compression error of estimated source signals.

(13) The method of anyone of (1) to (12), wherein the iterative algorithm comprises randomly generate an initial clustering.

(14) The method of anyone of (12) or (13), wherein each iteration comprises
choosing a predefined number of arbitrary components,
computing for all possible assignments of the chosen components to the clusters a compression error, and
assigning the chosen components to the clusters such that the compression error is minimized.

(15) The method of anyone of (12), (13), or (14), further comprising restarting the iterative algorithm several times with different initial clustering constellations and merging their results.

(16) The method of (15), wherein merging the results of the iterative algorithm comprises computing from the clustering results a similarity matrix.

(17) The method of anyone of (1) to (16), in which decomposing the magnitude part of the signal spectrum into spectral components is based on non-negative matrix factorization.

(18) The method of anyone of (1) to (12), further comprising precomputing the products $C_{l_1}^T c_{l_2}$ and $C_{l_1}^T C_{l_2}$ for all $1 \leq l_1, l_2 \leq L$, where $$C_l = \begin{bmatrix} 0 & 0 & \cdots & 0 \\ c_l(1) & 0 & \cdots & 0 \\ c_l(2) & c_l(1) & \cdots & 0 \\ \vdots & & \ddots & \\ c_l(N-1) & c_l(N-2) & \cdots & c_l(N-P) \end{bmatrix} \in \mathbb{R}^{N \times P},$$

$c_l(n)$ is the lth time component, and $c_l^T = [c_l(1) \ldots c_l(N)] \in \mathbb{R}^N$ the vector representation of the lth time component.

(19) The method of anyone of (1) to (18), further comprising estimating one or more source signals based on the clusters.

(20) A method comprising encoding a multi-channel audio signal, the coding comprising applying source separation to the multi-channel audio signal.

(21) An apparatus comprising a processor which is configured to
decompose a magnitude part of a signal spectrum of a mixture signal into spectral components, each spectral component comprising a frequency part and a time activation part and
cluster the spectral components to obtain one or more clusters of spectral components, wherein the clustering of the spectral components is computed in the time domain.

(22) An apparatus comprising a processor which is configured to
decompose a magnitude part of a signal spectrum of a mixture signal into spectral components, each spectral component comprising a frequency part and a time activation part; and
cluster the spectral components to obtain one or more clusters of spectral components, wherein the clustering of the spectral components is based on the compressibility of estimated source signals.

(23) An apparatus comprising a processor which is configured to
encode a multi-channel audio signal, the encoding comprising:
decompose a magnitude part of a signal spectrum of a mixture signal into spectral components, each spectral component comprising a frequency part and a time activation part; and
cluster the spectral components to obtain one or more clusters of spectral components.

(24) An apparatus comprising a processor which is configured to implement anyone of (1) to (20).

(25) An audio codec which is configured to
encode a multi-channel audio signal, the encoding comprising:
decompose a magnitude part of a signal spectrum of a mixture signal into spectral components, each spectral component comprising a frequency part and a time activation part; and clustering the spectral components to obtain one or more clusters of spectral components.

(26) An audio codec which is configured to implement anyone of (1) to (20).

(27) A computer program comprising program code causing a computer to perform the method according to anyone of (1) to (20), when being carried out on a computer.

(28) A non-transitory computer-readable recording medium that stores therein a computer program product, which, when executed by a processor, causes the method according to anyone of (1) to (20) to be performed.

REFERENCES

[1] T. Virtanen, "Monaural sound source separation by non-negative matrix factorization with temporal continuity and sparseness criteria," *IEEE Transactions on Audio, Speech and Language Processing*, vol. 15, pp. 1066-1074, 2007.

[2] M. Spiertz and V. Gnann, "Source-filter based clustering for monaural blind source separation," *Proc. Int. Conference on Digital Audio Effects*, 2009.

[3] R. Jaiswal, D. FitzGerald, D. Barry, E. Coyle, and S. Rickard, "Clustering NMF basis functions using shifted NMF for monaural sound source separation," *Proc. IEEE Conference on Acoustics, Speech, and Signal Processing (ICASSP)*, pp. 245-248, 2011.

[4] D. Lee and H. S. Seung, "Algorithms for non-negative matrix factorization," *Advances in neural information processing systems*, pp. 556-562, 2000.

[5] B. Yang, "A study of inverse short-time Fourier transform," *Proc. IEEE Conference on Acoustics, Speech, and Signal Processing (ICASSP)*, pp. 3541-3544, 2008.

[6] S. Haykin, *Adaptive Filter Theory*, Prentice-Hall, 4th edition, 2002.

[7] S. M. Kay, *Fundamentals of Statistical Signal Processing, Volume 1: Estimation Theory*, Prentice-Hall, 1993.

[8] S. Theodoridis and K. Koutroumbas, *Pattern Recognition*, Academic Press, 2006.

[9] E. M. Grais and H. Erdogan, "Single channel speech music separation using nonnegative matrix factorization and spectral mask," *Digital Signal Processing (DSP), 2011 17th International Conference on IEEE*, pp. 1-6, 2011.

[10] J. Fritsch and M. Plumbley, "Score informed audio source separation using constrained nonnegative matrix factorization and score synthesis," *Proc. IEEE Conference on Acoustics, Speech, and Signal Processing (ICASSP)*, pp. 888-891, 2013.

[11] J. Fritsch, "High quality musical audio source separation," *Master's Thesis, UPMC/IRCAM/Telecom ParisTech*, 2012.
[12] Z. Duan and B. Pardo, "Soundprism: An online system for score-informed source separation of music audio," *IEEE Journal of Selected Topics in Signal Processing*, vol. 5, no. 6, pp. 1205-1215, 2011.
[13] J. Fritsch, J. Ganseman, and M. D. Plumbley, "A comparison of two different methods for score-informed source separation," *5th International Workshop on Machine Learning and Music*, 2012.
[14] E. Vincent, R. Gribonval, and C. Fe'votte, "Performance measurement in blind audio source separation," *IEEE Transactions on Audio, Speech and Language Processing*, vol. 14, no. 4, pp. 1462-1469, 2006.
[15] P. Brady, "Matlab Mel filter implementation," http://www.mathworks.com/matlabcentral/fileexchange/23179-melfilter, 2014, [Online].
[16] F. Zheng, G. Zhang, and Z. Song, "Comparison of different implementations of MFCC," *Journal of Computer Science and Technology*, vol. 16, no. 6, pp. 582-589, 2001.
[17] B. W. Bader and T. G. Kolda, "MATLAB tensor toolbox version 2.5," http://www.san-dia.gov/-tgkolda/Tensor-Toolbox/, 2012, [Online].
[18] B. W. Bader and T. G. Kolda, "Algorithm 862: MATLAB tensor classes for fast algorithm prototyping," *ACM Transactions on Mathematical Software*, vol. 32, no. 4, pp. 635-653, 2006.
[19] D. FitzGerald, "Harmonic/percussive separation using Median filtering," *International Conference on Digital Audio Effects*, 2010.

The invention claimed is:

1. A method, comprising:
decomposing a magnitude part of a signal spectrum of a mixture signal into a plurality of spectral components, each spectral component of the plurality of spectral components comprising a frequency component and a time component;
applying an inverse short-time Fourier transform (ISTFT) to the plurality of spectral components to generate a plurality of time components; and
clustering the plurality of time components, in a time domain and based on an iterative algorithm, to obtain one or more clusters of time components, the iterative algorithm minimizing an energy of a compression error of estimated source signals.

2. The method of claim 1, wherein the clustering comprises generating the one or more clusters of time components based on the spectral components.

3. The method of claim 1, wherein the clustering the time components is based on a compressibility of estimated source signals.

4. The method of claim 1, wherein the clustering the time components comprises minimizing the compression error of the estimated source signals.

5. The method of claim 1, wherein the clustering the time components is based on minimizing the energy of an overall compression error according to $$\|e\|^2 = \|x\|^2 - 2\sum_{i=1}^{M} x^T \hat{S}_i (\hat{S}_i^T \hat{S}_i)^{-1} \hat{S}_i^T \hat{s}_i + \sum_{i=1}^{M}\sum_{j=1}^{M} \hat{s}_i^T \hat{S}_i (\hat{S}_i^T \hat{S}_i)^{-1} \hat{S}_i^T \hat{S}_j (\hat{S}_j^T \hat{S}_j)^{-1} \hat{S}_j^T \hat{s}_j.$$

with $$\hat{S}_i = \begin{bmatrix} 0 & 0 & \cdots & 0 \\ \hat{s}_i(1) & 0 & \cdots & 0 \\ \hat{s}_i(2) & \hat{s}_i(1) & \cdots & 0 \\ \vdots & & \ddots & \\ \hat{s}_i(N-1) & \hat{s}_i(N-2) & \cdots & \hat{s}_i(N-P) \end{bmatrix} \in \mathbb{R}^{N \times P}$$

where $\|e\|^2$ denotes an energy of the overall compression error, x denotes a mixture signal, $\hat{s}_i$ denotes an estimated source signal, M denotes a total number of clusters, N gives a length of the time domain signal, and P gives a length of a linear predictive coding (LPC) filter.

6. The method of claim 1, wherein the iterative algorithm comprises randomly generating an initial clustering.

7. The method of claim 1, wherein each iteration of the iterative algorithm comprises:
choosing a predefined number of arbitrary components;
computing a compression error for all possible assignments of the chosen components to the one or more clusters; and
assigning the chosen components to the one or more clusters such that the compression error is minimized.

8. The method of claim 1, further comprising:
restarting the iterative algorithm several times with different initial clustering constellations and merging their results.

9. The method of claim 1, wherein the decomposing the magnitude part of the signal spectrum into the spectral components is based on non-negative matrix factorization.

10. The method of claim 1, further comprising:
precomputing the products $C_{l_1}^T c_{l_2}$ and $C_{l_1}^T C_{l_2}$ for all $1 \le l_1, l_2 \le L$, where $$C_l = \begin{bmatrix} 0 & 0 & \cdots & 0 \\ c_l(1) & 0 & \cdots & 0 \\ c_l(2) & c_l(1) & \cdots & 0 \\ \vdots & & \ddots & \\ c_l(N-1) & c_l(N-2) & \cdots & c_l(N-P) \end{bmatrix} \in \mathbb{R}^{N \times P},$$

$c_l(n)$ is an lth time component, and $c_l^T = [c_l(1) \ldots c_l(N)] \in \mathbb{R}^N$ is a vector representation of the lth time component.

11. The method of claim 1, further comprising:
estimating one or more source signals based on the one or more clusters.

12. The method of claim 2, wherein the generating the one or more clusters of time components is performed according to $$c_l(n) = ISTFT\left\{ \frac{(w_l h_l^T)^{\wedge 2}}{\sum_{l=1}^{L} (w_l h_l^T)^{\wedge 2}} \cdot *S \right\}$$

where $\{w_l, h_l\}$ denotes an lth spectral component of the signal spectrum,
$c_l(n)$ denotes a time component which corresponds to the lth spectral component, and
where S denotes a signal spectrum.

13. The method of claim 4, wherein the compression error is determined based on linear predictive coding (LPC).

14. The method of claim 4, wherein the compression error is computed according to $$e(n)=\Sigma_{i=1}^{M}e_{i}(n),$$

where $e_i(n)$ denotes the compression error for an ith estimated source signal $\hat{s}_i(n)$ and M denotes a total number of clusters.

15. The method of claim 8, wherein the merging the results of the iterative algorithm comprises computing, from the clustering results, a similarity matrix.

16. The method of claim 14, wherein the compression error for the estimated source signal is computed according to $$e_i(n)=\hat{s}_i(n)-(h_{\hat{s}_i}*\hat{s}_i)(n),$$

where, $e_i(n)$ denotes the compression error for the ith estimated source signal, $\hat{s}_i(n)$ denotes the ith estimated source signal, and $h_{\hat{s}_i}(n)$ denotes a causal impulse response of an optimal linear predictive coding filter for the ith estimated source signal.

17. A method, comprising:
encoding a multi-channel audio signal by applying source separation to the multi-channel audio signal, wherein the encoding includes:
   decomposing a magnitude part of a signal spectrum of a mixture signal into a plurality of spectral components, each spectral component of the plurality of spectral components comprising a frequency component and a time component;
   applying an inverse short-time Fourier transform (ISTFT) to the plurality of spectral components to generate a plurality of time components; and
   clustering the plurality of time components, in a time domain and based on an iterative algorithm, to obtain one or more clusters of time components, the iterative algorithm minimizing an energy of a compression error of estimated source signals.

18. An apparatus, comprising:
processing circuitry configured to
   decompose a magnitude part of a signal spectrum of a mixture signal into a plurality of spectral components, each spectral component of the plurality of spectral components corresponding to a frequency matrix and a time activation matrix;
   apply an inverse short-time Fourier transform (ISTFT) to the plurality of spectral components to generate a plurality of time components; and
   cluster the plurality of time components, in a time domain and based on an iterative algorithm, to obtain one or more clusters of time components, the iterative algorithm minimizing an energy of a compression error of estimated source signals.

19. An apparatus, comprising:
processing circuitry configured to encode a multi-channel audio signal by:
   decomposing a magnitude part of a signal spectrum of a mixture signal into a plurality of spectral components, each spectral component of the plurality of spectral components comprising a frequency matrix and a time activation matrix;
   applying an inverse short-time Fourier transform (ISTFT) to the plurality of spectral components to generate a plurality of time components; and
   clustering the plurality of time components, in a time domain and based on an iterative algorithm, to obtain one or more clusters of time components, the iterative algorithm minimizing an energy of a compression error of estimated source signals.

20. An audio codec executed by processing circuitry, wherein execution of the audio codec comprises:
encoding a multi-channel audio signal by:
   decomposing a magnitude part of a signal spectrum of a mixture signal into a plurality of spectral components, each spectral component of the plurality of spectral components comprising a frequency matrix and a time activation matrix;
   applying an inverse short-time Fourier transform (ISTFT) to the plurality of spectral components to generate a plurality of time components; and
   clustering the plurality of time components, in a time domain and based on an iterative algorithm, to obtain one or more clusters of time components, the iterative algorithm minimizing an energy of a compression error of estimated source signals.

21. A method, comprising:
decomposing a magnitude part of a signal spectrum of a mixture signal into a plurality of spectral components, each spectral component of the plurality of spectral components comprising a frequency component and a time component;
clustering the spectral components, in a time domain and based on an iterative algorithm which minimizes an energy of a compression error of estimated source signals, to obtain one or more clusters of spectral components; and
restarting the iterative algorithm several times with different initial clustering constellations and merging results of each iteration of the iterative algorithm, wherein
the merging the results comprises computing, from the clustering results, a similarity matrix.

22. An apparatus, comprising:
processing circuitry configured to
   decompose a magnitude part of a signal spectrum of a mixture signal into a plurality of spectral components, each spectral component of the plurality of spectral components comprising a frequency component and a time component;
   cluster the spectral components, in a time domain and based on an iterative algorithm which minimizes an energy of a compression error of estimated source signals, to obtain one or more clusters of spectral components; and
   restart the iterative algorithm several times with different initial clustering constellations and merging results of each iteration of the iterative algorithm, wherein
the merging the results comprises computing, from the clustering results, a similarity matrix.

* * * * *